US008830558B2

(12) United States Patent
Kuo et al.

(10) Patent No.: US 8,830,558 B2
(45) Date of Patent: Sep. 9, 2014

(54) ELECTROWETTING DISPLAY DEVICE

(71) Applicant: Industrial Tecnology Research Institute, Hsinchu (TW)

(72) Inventors: Shu-Wei Kuo, New Taipei (TW); Yun-Sheng Ku, Tongxiao Township, Miaoli County (TW); Wei-Yuan Cheng, Zhubei (TW); Pei-Pei Cheng, Taoyuan (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 13/763,274

(22) Filed: Feb. 8, 2013

(65) Prior Publication Data
US 2013/0222879 A1  Aug. 29, 2013

(30) Foreign Application Priority Data

Feb. 24, 2012 (TW) .............................. 101106154 A

(51) Int. Cl.
G02B 26/00 (2006.01)
G02B 26/02 (2006.01)
G02F 1/07 (2006.01)

(52) U.S. Cl.
CPC .................................. *G02B 26/005* (2013.01)
USPC ........... 359/295; 359/290; 359/245; 359/228; 359/253

(58) Field of Classification Search
CPC ......... G02B 26/005; G09G 3/348; G02F 1/07
USPC ................. 359/290–295, 298, 245, 253, 228; 345/32, 60, 173–175, 105–107; 349/84, 110; 445/24; 216/13, 17
See application file for complete search history.

(56) References Cited

U.S. PATENT DOCUMENTS 7,529,012 B2 * 5/2009 Hayes et al. ................... 359/228
7,813,030 B2 * 10/2010 Lo et al. ......................... 359/295
7,821,699 B1 * 10/2010 Lo et al. ......................... 359/290

(Continued)

FOREIGN PATENT DOCUMENTS

| EP | 2 112 532 A1 | 10/2009 |
| TW | 2010 44010 | 8/2011 |
| WO | WO 2007 141218 | 12/2007 |
| WO | WO 2011 093706 | 8/2011 |

OTHER PUBLICATIONS

Hayes, et al., "Video-Speed Electronic Paper Based on Electrowetting", Nature, Sep. 2003, pp. 383-385, vol. 425.

(Continued)

*Primary Examiner* — Loha Ben
(74) *Attorney, Agent, or Firm* — Muncy, Geissler, Olds & Lowe, P.C.

(57) ABSTRACT

The disclosure provides an electrowetting display device. The electrowetting display device includes a first substrate and a second substrate disposed to each other. A first electrode layer may dispose on the first substrate. A second electrode layer may dispose on the second substrate. A hydrophobic dielectric layer is disposed on the first electrode layer. A first pixel rib is disposed on the first substrate. A second pixel rib is disposed on the first pixel rib. A water contact angle of the second pixel rib may be larger than that of the first pixel rib. A first liquid and a second liquid may be disposed in between the first substrate and the second substrate.

34 Claims, 6 Drawing Sheets

(56) References Cited

U.S. PATENT DOCUMENTS

| | | | | |
|---|---|---|---|---|
| 7,872,790 | B2* | 1/2011 | Steckl et al. | 359/253 |
| 8,014,054 | B2 | 9/2011 | Lo et al. | |
| 8,059,328 | B1* | 11/2011 | Kuo et al. | 359/290 |
| 8,319,759 | B2* | 11/2012 | Jacobson et al. | 345/204 |
| 2005/0151709 | A1 | 7/2005 | Jacobson et al. | |
| 2008/0014823 | A1 | 1/2008 | Hayes et al. | |
| 2008/0174846 | A1 | 7/2008 | Morozumi et al. | |
| 2011/0013255 | A1 | 1/2011 | Hsieh | |
| 2011/0157677 | A1 | 6/2011 | Chen et al. | |
| 2013/0278994 | A1* | 10/2013 | Feil | 359/296 |
| 2013/0342889 | A1* | 12/2013 | Kim et al. | 359/290 |

OTHER PUBLICATIONS

B. Sun, et al., "Scalable Fabrication of Electrowetting Displays with Self-Assembled Oil Dosing", Applied Physics Letters, 2007, 3 pages, vol. 91.

Ji-Yen Cheng, et al., "Electrowetting (EW)-Based Valve Combined with Hydrophilic Teflon Microfluidic Guidance in Controlling Continuous Fluid Flow", Biomedical Microdevices, 2004, pp. 341-347, vol. 6:4.

Victor A. Lifton, et al., "Preparation and Electrowetting Transitions on Superhydrophobic/Hydrophilic Bi-Layer Structures", Aug. 29, 2010, 10 pages.

Ku, et al., "Single-Layered Multi-Color Electrowetting Display by Using Ink-Jet-Printing Technology and Fluid-Motion Prediction with Simulation", Journal of the SID, 2011, p. 488-495

Kuo, et al., "A Development of Color-Filter-Free Electrowetting Color Display by Using Ink Jet Printing Technology", Proceedings of the $17^{th}$ International Display Workshops, 2010, p. 435-438.

Taiwan Office Action for Taiwan Application No. 101106154 dated Jan. 7, 2014.

* cited by examiner

ELECTROWETTING DISPLAY DEVICE

CROSS REFERENCE TO RELATED APPLICATION

The present application is based on, and claims priority from, Taiwan Application Serial Number 101106154, filed Feb. 24, 2012, the disclosure of which is hereby incorporated by reference herein in its entirety.

BACKGROUND

1. Field of the Disclosure

The present disclosure relates to an electrowetting display device.

2. Description of the Related Art

Photo-electrical technology has experienced rapid growth, and various displays have been rapidly developed.

The Liquavista company has developed EWDs. EWDs comprise pixels constructed by non-polarized colored oil drops, a polarized aqua solution, a hydrophobic layer and hydrophilic pixel ribs. The non-polarized oil drops are disposed on the hydrophobic layer and isolated from each other by the hydrophilic pixel ribs. The polarized aqua solution is disposed on the non-polarized oil drops. The operation principle of the EWDs is as follows. When the display is not applied a voltage, the non-polarized oil drops spread on the hydrophobic layer, so the display shows the color of the oil, and it is a dark state. When the voltage is applied, the polarized aqua solution could be attracted to the hydrophobic layer due to the electrostatic induction, and it is a bright state.

In order to comply with the requirements of the production speed, dipping is the method to the non-polarized oil. The non-polarized oil suffers from interface tension between the pixel ribs and the subsequently filled-in polarized solution, thereby, the non-polarized oil cut off by the polarized solution. The thickness of the non-polarized oil is designed as high as the height of the pixel ribs. If the display has a 75% aperture ratio, an average height of the non-polarized oil in the bright state may be four times greater than that in the dark state. In this situation, the non-polarized oil of the EWDs may overflow to adjacent pixels, causing the uniformity of the operated display to be influenced.

Various methods have been developed to improve the stability of the EWDs. Apertures of electrodes of the EWDs can be designed to divide a region of shrunk oil drops into several sub-regions, Additional ribs can be fabricated on an upper substrate of the EWDs. The upper substrate is then assembled opposite to a lower substrate to isolate adjacent pixels from each other.

BRIEF SUMMARY

An electrowetting display device is provided. An exemplary embodiment of an electrowetting display device comprises a first substrate and a second substrate disposed opposite to each other. A first electrode layer is disposed on the first substrate. A second electrode layer is disposed on the second substrate. A hydrophobic dielectric layer is disposed on the first electrode layer. A first pixel rib is disposed on the first substrate. A second pixel rib is disposed on the first pixel rib. A contact angle of water with respect to the second pixel rib may be larger than a contact angle of water with respect to the first pixel rib. A first liquid and a second liquid are disposed between the first substrate and the second substrate.

Another exemplary embodiment of an electrowetting display device comprises a first substrate and a second substrate disposed opposite to each other. A first electrode layer is disposed on the first substrate. A second electrode layer is disposed on the second substrate. A hydrophobic dielectric layer is disposed on the first electrode layer. A first pixel rib is disposed on the first substrate. A second pixel rib is disposed on the first pixel rib. The first pixel rib and the second pixel rib comprise an ultra-violet light curing photoresist material or a thermal curing photoresist material, wherein the ultra-violet light curing photoresist material or the thermal curing photoresist material contain at least one hydrophilic material, and wherein a content of the at least one hydrophilic material of the first pixel rib is different from that of a content of at least one of the hydrophilic material of the second pixel rib. A first liquid and a second liquid are disposed between the first substrate and the second substrate.

Yet another exemplary embodiment of an electrowetting display device comprises a first substrate and a second substrate disposed opposite to each other. A first electrode layer is disposed on the first substrate. A second electrode layer is disposed on the second substrate. A hydrophobic dielectric layer is disposed on the first electrode layer. A single pixel rib is disposed on the first substrate. The single pixel rib comprises a first hydrophilic region and a second hydrophilic region on the first hydrophilic region, and a contact angle of water with respect to the second pixel rib may be larger than a contact angle of water with respect to the first pixel rib. A first liquid and a second liquid are disposed between the first substrate and the second substrate.

A detailed description is given in the following embodiments with reference to the accompanying drawings.

BRIEF DESCRIPTION OF DRAWINGS

The disclosure can be more fully understood by reading the subsequent detailed description and examples with references made to the accompanying drawings, wherein:

FIG. 3b is a top view showing a bi-layered pixel rib of a pixel of the electrowetting display device as shown in FIG. 3a;

FIGS. 4b, 5b and 6b are cross sections taken along lines A-A' of FIGS. 4a, 5a and 6a.

DETAILED DESCRIPTION

Figure 1A:
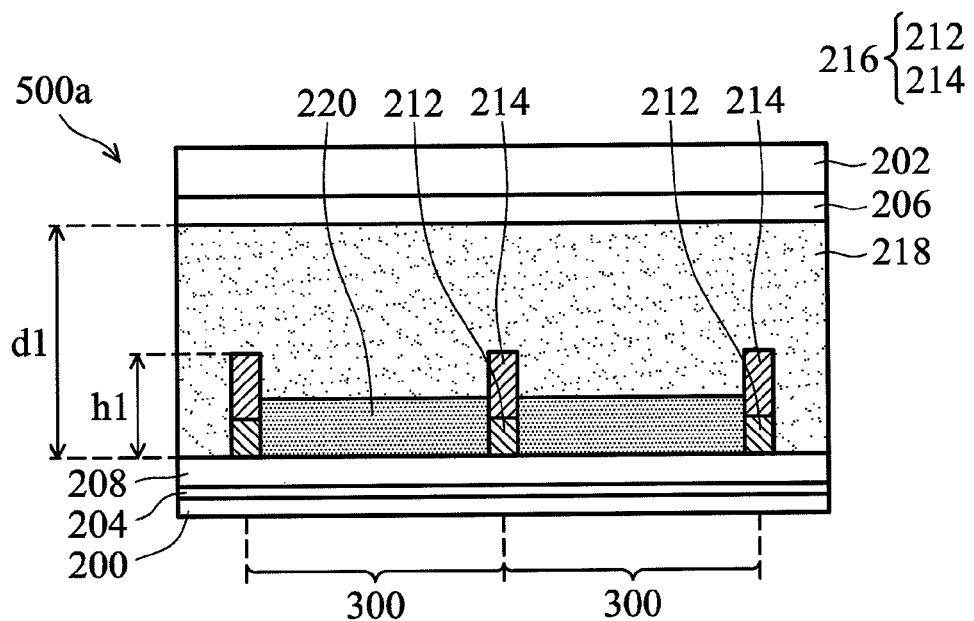
FIG. 1a is a cross section showing one exemplary embodiment of an electrowetting display device without an applied voltage.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments disclose an electrowetting display device. The electrowetting display device utilizes the adjusting of hydrophilic degrees of a bi-layered pixel rib structure and the arrangement of the bi-layered pixel rib structure, so that the filling amount of an oil in pixel region defined by the bi-layered pixel rib structure during a dip coating process. Also, a contact angle of water with respect to a lower pixel rib of the bi-layered pixel rib structure may design to be smaller than a contact angle of water with respect to an upper pixel rib of the bi-layered pixel rib structure.

FIG. 1a is a cross section showing one exemplary embodiment of an electrowetting display device 500a without an applied voltage. One exemplary embodiment of the electrowetting display device 500a comprises a first substrate 200 and a second substrate 202 disposed opposite to each other. In one embodiment, the first substrate 200 and the second substrate 202 may comprise rigid substrates comprising glasses or silicon wafers. Alternatively, the first substrate 200 and the second substrate 202 may comprise flexible substrates formed of poly(ethylene terephthalate) (PET), polyethylenenaphthalate (PEN), polycarbonate (PC), polyethersulfone (PES), polyimide (PI) or a metal foil.

As shown in FIG. 1a, a first electrode layer 204 is disposed on the first substrate 200, and a second electrode layer 206 is disposed on the second substrate 202. In one embodiment, the first electrode layer 204 and the second electrode layer 206 may be formed of the same materials such as metals or oxides comprising indium tin oxide (ITO), molybdenum tungsten (MoW) or indium zinc oxide (IZO). A hydrophobic (lipophile) dielectric layer 208 is disposed on the first electrode layer 204. In one embodiment, the hydrophobic dielectric layer 208 is usually composed of a dielectric layer and a hydrophobic (lipophile) layer. The dielectric layer may comprise silicon oxide (SiOx), silicon nitride (SiNx) oxynitride (SiOxNy), aluminum oxide ($Al_2O_3$), tantalum oxide ($Ta_2O_3$), titanium oxide ($TiO_2$), barium titanate ($BaTiO_3$), polyvinylidene difluoride (PVDF), combinations thereof or a polymer with a dielectric constant (k) being larger than 2. Also, the hydrophobic layer may comprise a polymer containing a fluorine containing polymer, a diamond like carbon (DLC) film, or a self-assembled silane molecular. The fluorine containing polymer may comprise Teflon AF-1600® (registered trademark of Dupont), Cytop® (registered trademark of ASAHI Glass CO., LTD) or Cytonix® (registered trademark of Cytonix corporation). The self-assembled silane molecular may comprise octadecyl trichlorosilane (OTS), 3,3,3 trifluoro-propylmethyl dichlorosilane (PMDCS), tridecafluoro-1,1,2,2-tetrahydrooctyl trichlorosilane (FOTS), heptadecafluoro-1,1,2,2-tetrahydrodecyl trichlorosilane (FDTS), dodecyl trichlorosilane (DDTCS), dimethyldichlorosilane (DDMS), (vinylundecyl tirchlorosilane (V11TCS) or aminopropyl trimethoxysilane (APTMS). In one embodiment, hydrophobic dielectric layer 208 may comprise a dielectric/insulating layer having a hydrophobic (lipophile) surface, a hydrophobic (lipophile) layer having dielectric/insulating characteristics or a composite layer constructed by laminating of at least one hydrophobic layer and at least one dielectric/insulating layer.

As shown in FIG. 1a, the electrowetting display device 500a comprises a bi-layered pixel rib 216 disposed on the hydrophobic dielectric layer 208. In another embodiment, a patterning process may be optionally performed on the hydinrophobic dielectric layer 208 to form a hydrophobic dielectric pattern (not shown). Next, the bi-layered pixel rib 216 is disposed over the first substrate 200. More specifically, in another embodiment, when the hydrophobic dielectric layer 208 is a single-layered structure, for example, a dielectric/insulating layer having a hydrophobic surface or a hydrophobic layer having dielectric/insulating characteristics, the bi-layered pixel rib 216 can be disposed on the first electrode layer 204 after forming the hydrophobic dielectric pattern from the hydrophobic dielectric layer 208. Alternatively, when the hydrophobic dielectric layer 208 is a composite layer constructed by laminating of at least one hydrophobic layer and at least one dielectric/insulating layer, the patterning process may be performed only on the hydinrophobic layer or performed on both the hydinrophobic layer and the dielectric/insulating layer, so that the bi-layered pixel rib 216 can be disposed on the dielectric/insulating layer or the first electrode layer 204 after forming the hydrophobic dielectric pattern from the hydrophobic dielectric layer 208. In other exemplary embodiments, another patterning process may be optionally performed on the first electrode layer 204 to form a first electrode pattern. Therefore, the bi-layered pixel rib 216 can be disposed on the first substrate 200 after forming the first electrode pattern and the hydrophobic dielectric pattern. In one exemplary embodiment, the bi-layered pixel rib 216 comprises a first pixel rib 212 close to the first substrate 200 (also referred to as a lower pixel rib 212) and a second pixel rib 214 (also referred to as an upper pixel rib 214) disposed on the first pixel rib 212. The first pixel rib 212 of the bi-layered pixel rib 216 is used to define a boundary of a pixel 300 of the electrowetting display device. The pixel 300 defined by the first pixel rib 212 may comprise a rectangular shape, a square shape, a triangular shape, a circular shape, a fan shape or hexagonal shape. In one exemplary embodiment, the first pixel rib 212 and the second pixel rib 214 may be formed of an ultra-violet (UV) light curing photoresist material or a thermal curing photoresist material, and the UV light curing photoresist material or the thermal curing photoresist material contains polyethylene glycol-based materials, polyurethane-based materials, polyamide-based materials or poly (2-hydroxy ethyl methacrylate)-based materials. For example, the first pixel rib 212 and the second pixel rib 214 may be formed of polyepoxide, polyethylene glycol, polyurethane, polyamide or poly(2-hydroxy ethyl methacrylate). In one exemplary embodiment, a total height of the first pixel rib 212 and the second pixel rib 214 is 3~50 μm. In one exemplary embodiment, a shape of the first pixel rib 212 may be the same as the shape of the second pixel rib 214 from a top view. In one embodiment as shown in FIG. 1a, the total height h1 of the first pixel rib 212 and the second pixel rib 214 may be less than a vertical distance d1 between the hydrophobic dielectric layer 208 and the second electrode layer 206. Therefore, the second pixel rib 214 of the bi-layered pixel rib 216 may not connect to the second electrode layer 206 disposed on the second substrate 202. In another exemplary embodiment, the total height h1 of the first pixel rib 212 and the second pixel rib 214 is equal to the vertical distance d1 between the hydrophobic dielectric layer 208 and the second electrode layer 206. Therefore, the second pixel rib 214 of the bi-layered pixel rib 216 bonds to the second electrode layer 206 disposed on the second substrate 202.

In one embodiment, surface energies of the first pixel rib 212 and the second pixel rib 214 may design to be larger than 36 mN/m. Additionally, a contact angle of water with respect to the second pixel rib 214 is designed to be larger than a contact angle of water with respect to the first pixel rib 212 to control the filling amount of the oil. For example, a contact angle of water with respect to the first pixel rib 212 is designed to be between 20 and 60 degrees, and a contact angle of water with respect to the second pixel rib 214 is designed to be between 40 and 80 degrees. Alternatively, for example, a normalized ratio of a contact angle of water with respect to the first pixel rib 212 to a contact angle of water with respect to the second pixel rib 214 may design to be between 0.5:1 and 0.9:1. In one exemplary embodiment, the photoresist material can be added various amounts or various types of additives including inorganic hydrophilic materials to respectively form the lower hydrophilic first pixel rib 212 and the upper hydrophobic (lipophile) second pixel rib 214. The inorganic hydrophilic materials may comprise silicon-base substance, carbon nanotubes or titanium dioxide. Alternatively, the photoresist material can be added an additive including an organic hydrophilic material comprising a compound, which contains hydroxyl, aldehyde, carbonate, carboxylate, carboxylic, ether, carbonyl, oxyethylene group, hydroxyl group-containing acrylate, amid amine or oxime, a monomer or an oligomer to form the lower hydrophilic first pixel rib 212 and the upper hydrophobic (lipophile) second pixel rib 214. In one exemplary embodiment, the organic hydrophilic material may have a viscosity of less than 2000 cps/25° C. For example, the organic hydrophilic material may comprise glycerin dimethacrylate, glycerin mono(meth)acrylate, ethyleneglycol dimethacrylate, diethyleneglycol dimethacrylat, 4-hydroxybutyl methacrylate, 2-hydroxypropyl methacrylate, hydroxyethyl acrylate, 2-hydroxyethyl methacrylate, glycidyl methacrylate-acrylic acid additive, trimethylol methacrylate or trimethylol propane methacrylate. The organic hydrophilic material as such may be a surfactant, which is a molecule or polymer having both a hydrophilic and a hydrophobic group, for example, trisiloxane, alkoxylate, or Poly[dimethylsiloxane-co-(hydroxyethoxy ethoxy propyl) methylsiloxane]. In another exemplary embodiment, the first pixel rib 212 may comprise a black matrix, which may be formed by a black resin, to improve a contrast of the display.

In another exemplary embodiment, the electrowetting display device 500a may also comprise a single layer structured pixel rib formed of an ultra-violet (UV) light curing photoresist material or a thermal curing photoresist material, and the UV light curing photoresist material or the thermal curing photoresist material may contain polyethylene glycol-based materials, polyurethane-based materials, polyamide-based materials or poly(2-hydroxy ethyl methacrylate)-based materials. After forming the single layer structured pixel rib, a thermal process, a solution process or a plasma treatment process can be performed to change a ratio of a contact angle of water with respect to an upper portion of the single layer structured pixel rib to a contact angle of water with respect to a lower portion of the single layer structured pixel rib. In one embodiment, the solution process may be performed by adding various reactive materials with different volume ratios or different reactive group to the upper portion and the lower portion of the single layer structured pixel rib. For example, the reactive materials may have reactive groups comprising ester, ether ester, carbonate, etc. The upper portion and the lower portion of the single layer structured pixel rib are treated in an alkali solution or ozone to change a ratio of a contact angle of water with respect to an upper portion of the single layer structured pixel rib to a contact angle of water with respect to a lower portion of the single layer structured pixel rib. In one embodiment, the solution process may be performed after forming the single layer structured pixel rib. Alternatively, the may be performed during a photolithography process used to form the single layer structured pixel rib. Therefore, the single layer structured pixel rib may have a first hydrophilic region (e.g. a region occupied by the first pixel rib 212) and a second hydrophilic region (e.g. a region occupied by the second pixel rib 214) on the first hydrophilic region, so that a lower and more hydrophilic first hydrophilic region and the upper and more hydrophobic (lipophile) second hydrophilic region are formed. Alternatively, the photoresist material used to form the single layer structured pixel rib may be added with additives. In this instance, the additives sink into a lower portion of the single layer structured, so that the single layer structured pixel rib may have a first hydrophilic region (e.g. a region occupied by the first pixel rib 212) and a second hydrophilic region (e.g. a region occupied by the second pixel rib 214) on the first hydrophilic region. The lower first hydrophilic region is more hydrophilic, and the upper second hydrophilic region is more hydrophobic (lipophile).

As shown in FIG. 1a, the electrowetting display device 500a comprises a first liquid 218 and a second liquid 220 disposed between the first substrate 200 and the second substrate 202. In one embodiment, the second liquid 220 contacts the hydrophobic dielectric layer 208, and the first liquid 218 is positioned on the second liquid 220. In one embodiment, the first liquid 218 is a polarized liquid and the second liquid 220 may have a chemical polarity larger than or equal to 0, and smaller than or equal to 3. The second liquid 220 may be a weak polarized liquid, having a polarity which is weaker than the polarized liquid, or a non-polarized liquid. In one embodiment, the first liquid 218 may comprise water, aquasolution or alcohols. Additionally, the first liquid 218 may be added electrolytes such as KCl or NaCl to increase ionic conductance of the first liquid 218. Also, the first liquid 218 may be added surfactants to reduce a surface tension of the first liquid 218. In one embodiment, the second liquid 220 may comprise silicon oil, n-alkane (C10~C16), dyes or pigments. The n-alkane (C10~C16) are, for example, decane, dodecane, tetradecane or hexadecane. The bi-layered pixel rib 216 may have a refraction index which may same as that of the first liquid 218 to prevent color display interference occurring on the electrowetting display from a top view due to the refraction index mismatch between the bi-layered pixel rib 216 and the first liquid 218.

Figure 1B:
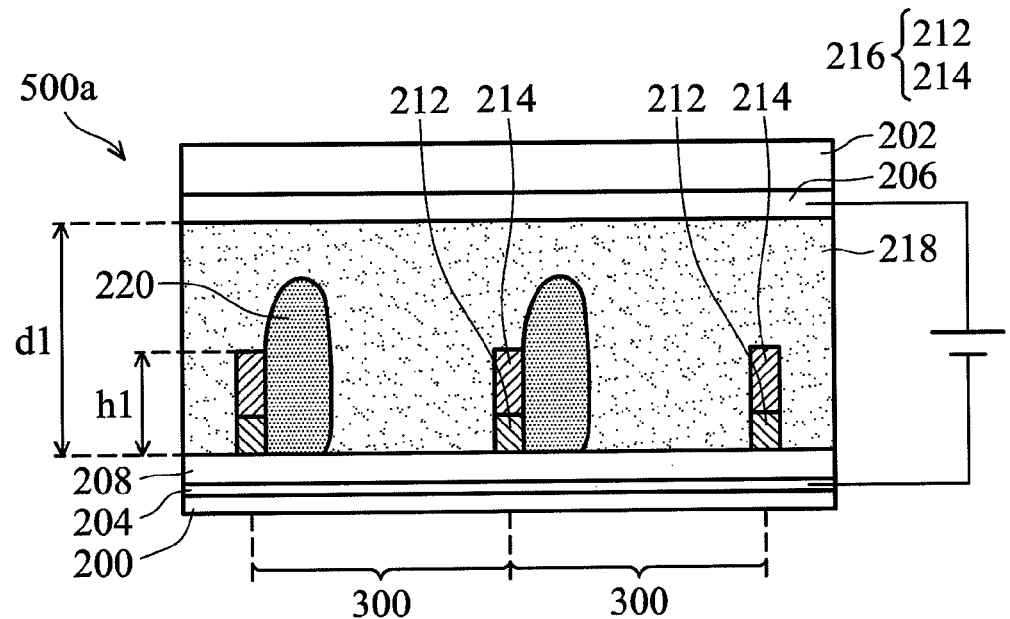
FIG. 1b is a cross section showing one exemplary embodiment of an electrowetting display device with an applied voltage.

By designing a ratio of a contact angle of water with respect to the upper pixel rib of the bi-layered pixel rib to a contact angle of water with respect to the lower pixel rib of the bi-layered pixel rib (comprising the first pixel rib 212 and the second pixel rib 214) may be in between 0.5:1 and 0.9:1 or by designing a ratio of a contact angle of water with respect to the upper hydrophilic region of the single-layer structured pixel rib to a contact angle of water with respect to the lower hydrophilic region of the single-layer structured pixel rib (comprising the first hydrophilic region and the second hydrophilic region) may be in between 0.5:1 and 0.9:1, a lower and more hydrophilic first pixel rib 212/first hydrophilic region and an upper and more hydrophobic (lipophile) second pixel rib 214/second hydrophilic region are formed. Therefore, the injection (thickness) of the second liquid during an ink coating process comprising a dip coating process, an ink jet printing (IJP) process or slit coating process may be controlled. As shown in FIG. 1b, when the electrowetting display device 500a is operated (applied a voltage), the overflow problem of the shrunk second liquid of the conventional electrowetting display device due to the over-injection of the second liquid can be avoided. Also, the uniformity and the reliability of the operated electrowetting display device can be improved without affecting the contrast thereof.

Figure 2:
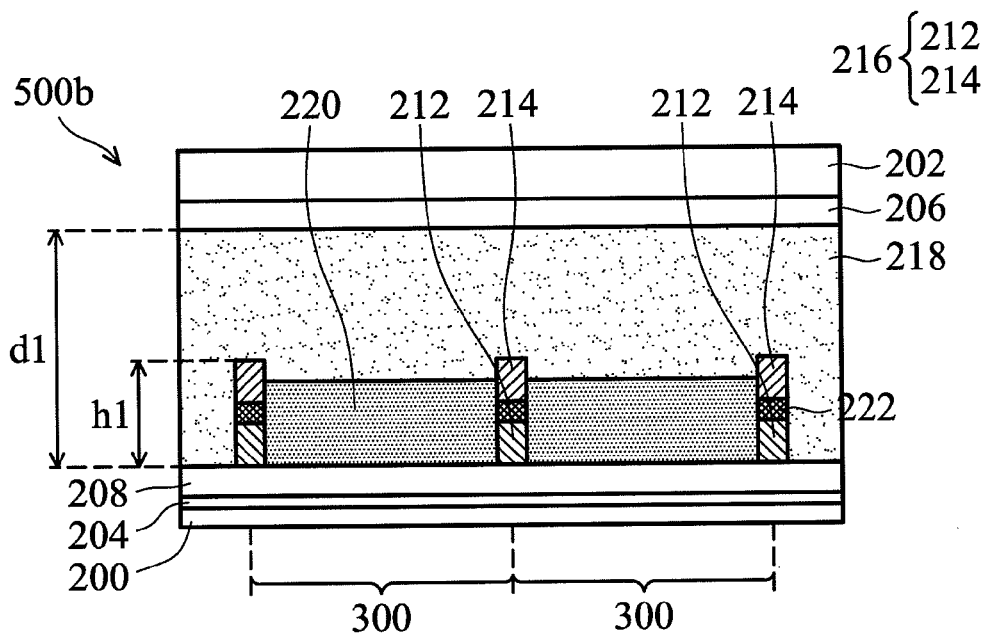
FIG. 2 is a cross section showing another exemplary embodiment of an electrowetting display device.

Please refer to FIG. 2, the differences between the exemplary embodiment of the electrowetting display device 500b as shown in FIG. 2 and the electrowetting display device 500a as shown in FIG. 1a are that the electrowetting display device 500b may further comprisea middle layer 222 disposed between the first pixel rib 212 and the second pixel rib 214. In one embodiment, the middle layer 222 may comprise an adhesive layer or a black-colored light shielding material.

When the middle layer 222 is an adhesive layer, adhesion between the first pixel rib 212 and the second pixel rib 214 can be improved. The adhesive layer may be formed of light cure adhesives, pressure sensitive adhesives or moisture-curing adhesives. Additionally, when the middle layer 222 is a black-colored light shielding material, the middle layer 222 can further improve the contrast of the display. The black light shielding material may be formed of a resin black matrix containing carbon black.

Figure 3A:
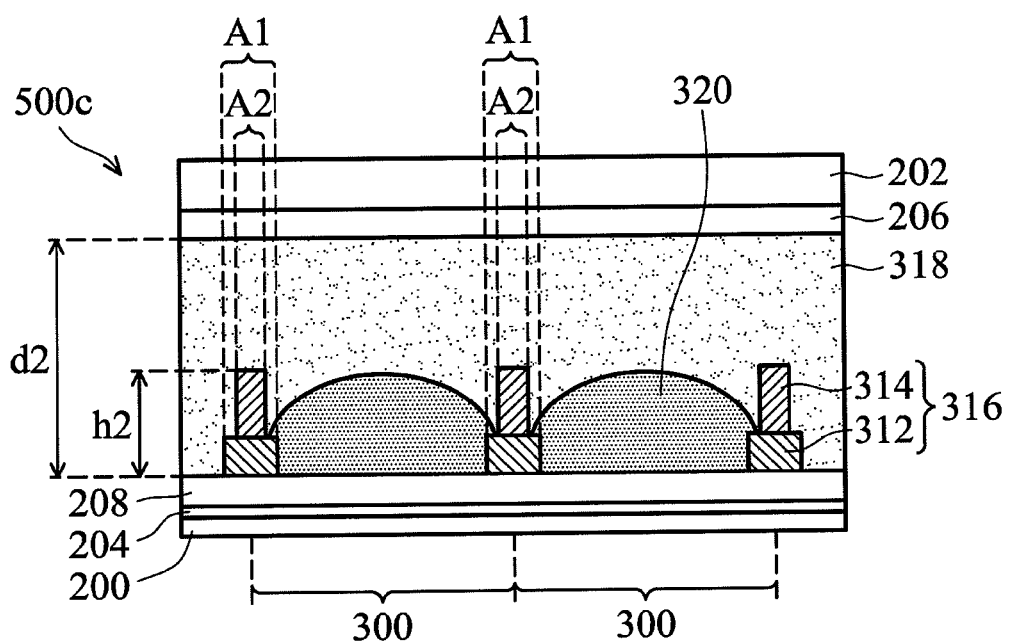
FIG. 3a is a cross section showing yet another exemplary embodiment of an electrowetting display device without an applied voltage.
Figure 3B:
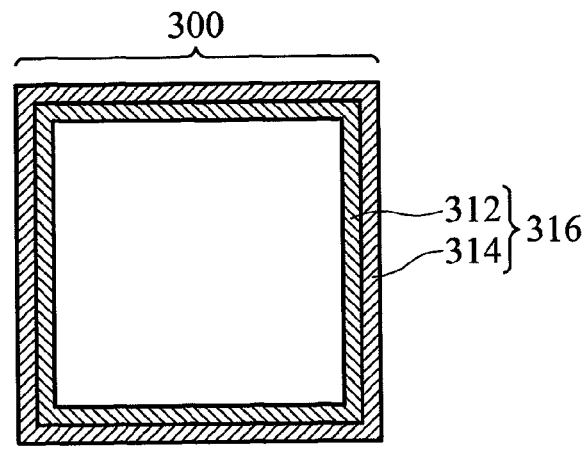

In another embodiment, a shape of a longitudinal cross section of the bi-layered pixel rib (e.g. a shape of the cross section of the bi-layered pixel rib as shown in FIG. 3a) can be designed, so that the lower first pixel rib extends toward the pixel area to achieve a predetermined height/width ratio of the lower first pixel rib to the upper second pixel rib. A convex-shaped bi-layered pixel rib is therefore formed. The second liquid (e.g. oil) 320 having a convex surface profile can be formed by performing the dip coating process to the convex-shaped bi-layered pixel rib. FIG. 3a is a cross section showing yet another exemplary embodiment of an electrowetting display device 500c without an applied voltage. FIG. 3b is a top view showing a bi-layered pixel rib 316 of a pixel 300 of the electrowetting display device 500c as shown in FIG. 3a. As shown in FIGS. 3a and 3b, the differences between the bi-layered pixel rib 316 of the electrowetting display device 500c and the electrowetting display devices 500a, 500b as shown in FIGS. 1a, 2 are that a lower first pixel rib 312 laterally (i.e. a direction parallel to the surface of the first substrate 200) protrudes from an upper second pixel rib 314. A width of the first pixel rib 312 is larger than that of the second pixel rib 314 from a top view as shown in FIG. 3b. In another embodiment, a height of the longitudinal cross section the first pixel rib 312 may be at least larger than or equal to 0.1 μm, and a total height of the first pixel rib 312 and the second pixel rib 314 may be 3~50 μm. Also, the first pixel rib has a width A1 of a longitudinal cross section, and the second pixel rib 314 has a width A2 of a longitudinal cross section. A width of a longitudinal cross section of the first pixel rib to a width of a longitudinal cross section of the second pixel rib ratio (A1/A2) is designed to be larger than or equal to 1. For example, a ratio of the width A1 of a longitudinal cross section of the first pixel rib 312 to the width A2 of a longitudinal cross section of the second pixel rib 314 may be between 1:0.98 and 1:0.4. In one embodiment, surface energies of the first pixel rib 312 and the second pixel rib 314 of the bi-layered pixel rib 316 are designed to be larger than 36 mN/m. Additionally, a contact angle of water with respect to the second pixel rib 314 is designed to be larger than a contact angle of water with respect to the first pixel rib 312 to control the filling amount of the oil. For example, a contact angle of water with respect to the first pixel rib 312 is designed to be between 20 and 70 degrees, and a contact angle of water with respect to the second pixel rib 314 is designed to be between 30 and 80 degrees. Alternatively, for example, a normalized ratio of a contact angle of water with respect to the first pixel rib 312 to a contact angle of water with respect to the second pixel rib 314 is designed to be between 0.5:1 and 0.9:1. In this embodiment, the first pixel rib 312 and the second pixel rib 314 of the electrowetting display device 500c may be formed by materials, which are respectively the same as the first pixel rib 212 and the second pixel rib 214 of the electrowetting display devices 500a and 500b as shown in FIGS. 1a and 2.

In one embodiment as shown in FIG. 3a, the total height h2 of the first pixel rib 312 and the second pixel rib 314 may less than a vertical distance d2 between the hydrophobic dielectric layer 208 and the second electrode layer 206. Therefore, the second pixel rib 314 of the bi-layered pixel rib 316 may not connect to the second electrode layer 206 disposed on the second substrate 202. In another embodiment, the total height h2 of the first pixel rib 312 and the second pixel rib 314 may equal to the vertical distance d2 between the hydrophobic dielectric layer 208 and the second electrode layer 206. Therefore, the second pixel rib 314 of the bi-layered pixel rib 316 connects to the second electrode layer 206 disposed on the second substrate 202.

Figure 3C:
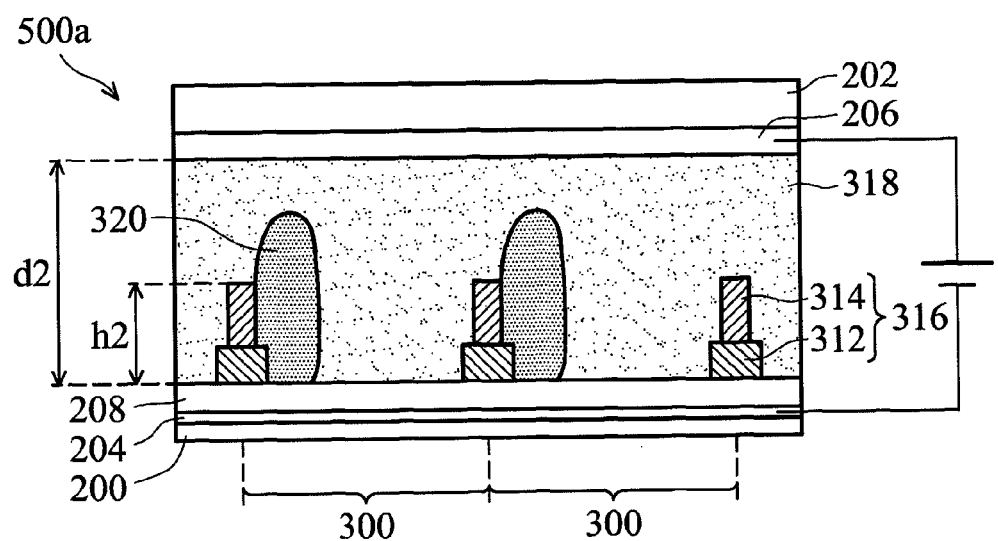
FIG. 3c is a cross section showing yet another exemplary embodiment of an electrowetting display device with an applied voltage.

By designing a structural arrangement of the upper pixel rib and the lower pixel rib of the bi-layered pixel rib (the first pixel rib 312 and the second pixel rib 314), a width of a longitudinal cross section of the first pixel rib to a width of a longitudinal cross section of the second pixel rib ratio (A1/A2) can be designed to larger than or equal to 1. By controlling the normalized contact angles of water with respect to the first pixel rib 312 and the second pixel rib 314, a lower and more hydrophilic first pixel rib 312 and the upper and more hydrophobic (lipophile) second pixel rib 314 are formed. Also, by designing a structural arrangement of the upper pixel rib and the lower pixel rib of the bi-layered pixel rib (the first pixel rib 312 and the second pixel rib 314), the second liquid 320 may have a convex surface profile, and the surface of the second liquid 320, which is adjacent to a boundary of the pixel 300, to contact the first pixel rib 312 without climbing up to the second pixel rib 314. Therefore, the thickness distribution of the second liquid 320 in the pixel 300 may be controlled after performing an ink coating process comprising a dip coating process, an ink jet printing (IJP) process or slit coating process. As shown in FIG. 3c, when the electrowetting display device 500c is operated (applied a voltage), the overflow problem of the shrunk second liquid of the conventional electrowetting display device due to over-injection of the second liquid can be avoided. Also, the surface of the second liquid, which may be adjacent to a boundary of the pixel 300, may contact the first pixel rib, so that the second liquid can have a small thickness in a portion, which may be adjacent to a boundary of the pixel, than other portions. The uniformity and the reliability of the operated electrowetting display device can be improved without affecting the contrast of the display.

Figure 4A:
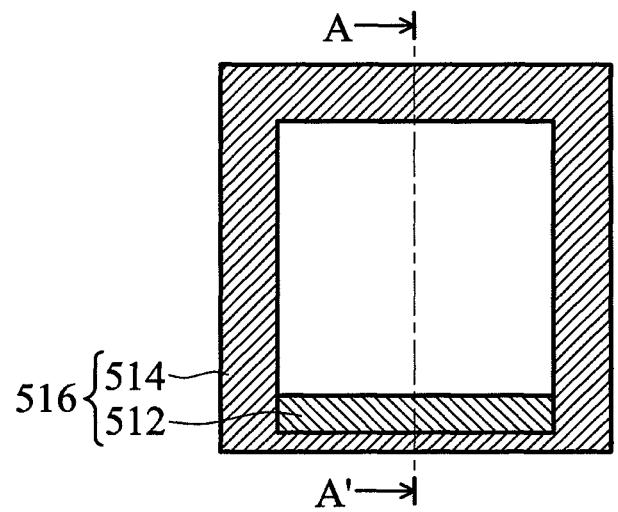
FIGS. 4a, 5a and 6a are top views showing other exemplary embodiments of an electrowetting display device.
Figure 4B:
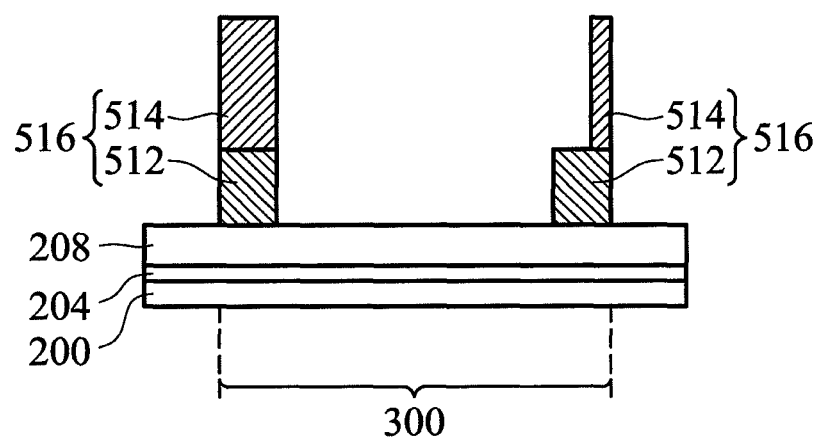
Figure 5A:
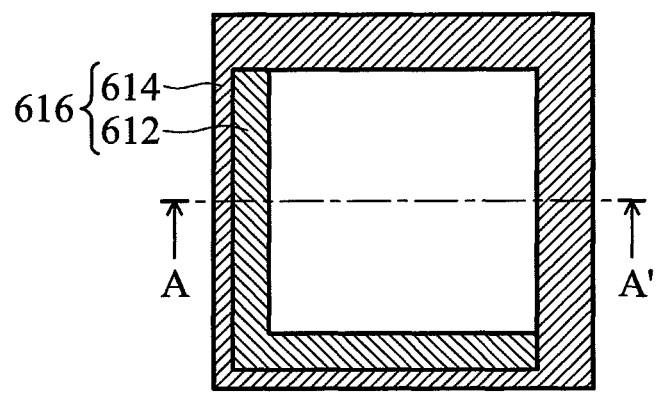
Figure 5B:
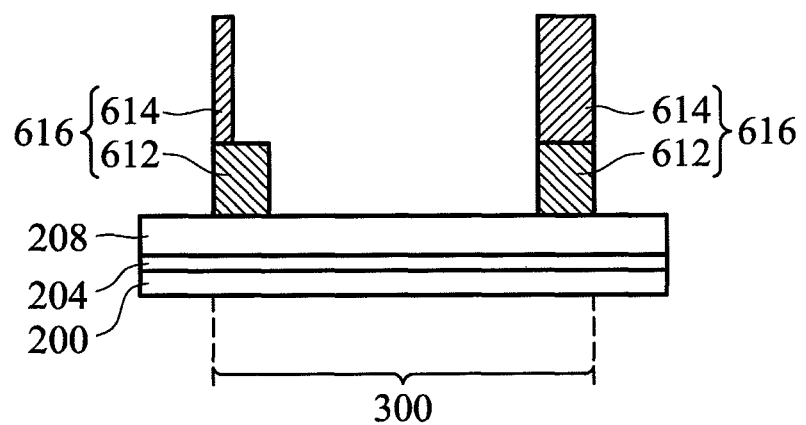
Figure 6A:
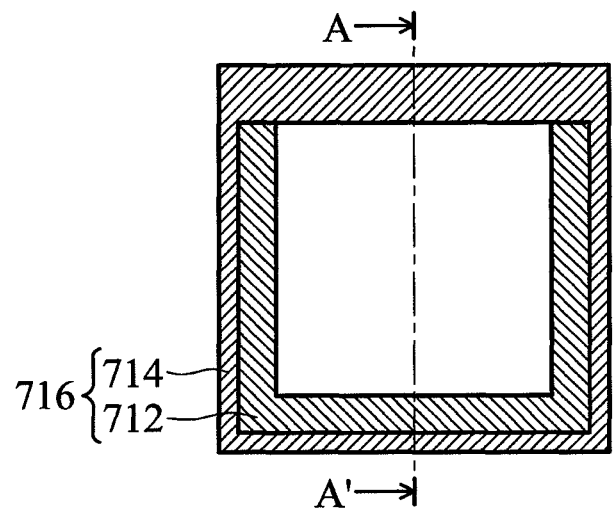
Figure 6B:
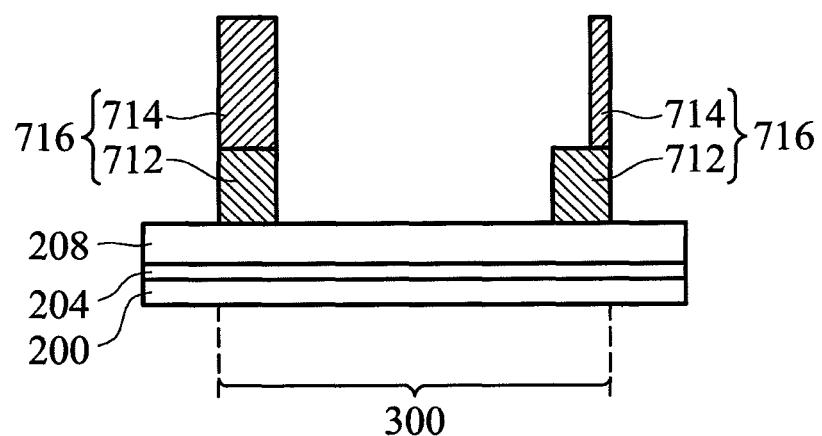

FIGS. 4a, 5a and 6a are top views showing other exemplary embodiments of an electrowetting display device. FIGS. 4b, 5b and 6b are cross sections taken along line A-A' of FIGS. 4a, 5a and 6a. For the convenience of showing a top-viewed structure and a cross-sectional structure of the bi-layered pixel rib, the second electrode layer, the second substrate, the first liquid and the second liquid are not shown herein for brevity. In the electrowetting display device as shown in FIGS. 4a and 4b, a bi-layered pixel rib 516 is designed in a way where a lower first pixel rib 512 has only one side laterally protruding from an upper second pixel rib 514. In the electrowetting display device as shown in FIGS. 5a and 5b, a bi-layered pixel rib 616 may design in a way where a lower first pixel rib 612 has only two adjacent sides laterally protruding from an upper second pixel rib 614. In the electrowetting display device as shown in FIGS. 6a and 6b, a bi-layered pixel rib 716 is designed in a way where a lower first pixel rib 712 has three adjacent sides laterally protruding from an upper second pixel rib 714. For other exemplary embodiments of the electrowetting display device as shown in FIGS. 4a, 4b to 6a, 6b, a width of a longitudinal cross section of the first pixel rib 512/612/712 to a width of a longitudinal cross section of the second pixel rib 514/614/714 ratio can be designed to be larger than or equal to 1. Also, the lower and more hydrophilic first pixel rib 512/612/712 and the upper and more hydrophobic (lipophile) second pixel rib 514/614/714 are formed.

Embodiments provide an electrowetting display device. By designing a ratio of a contact angle of water with respect to the upper pixel rib of the bi-layered pixel rib to a contact angle of water with respect to the lower pixel rib of the bi-layered pixel rib (may comprise the first pixel rib 212 and the second pixel rib 214) may be in between 0.5:1 and 0.9:1 or a contact angle of water with respect to the upper hydrophilic region of the single-layer structured pixel rib to a contact angle of water with respect to the lower hydrophilic region of the single-layer structured pixel rib (comprising the first hydrophilic region and the second hydrophilic region) may be in between 0.5:1 and 0.9:1, the lower and more hydrophilic first pixel rib 212/first hydrophilic region and the upper and more hydrophobic (lipophile) second pixel rib 214/second hydrophilic region are formed. Alternatively, by designing a structural arrangement of the upper pixel rib and the lower pixel rib of the bi-layered pixel rib (comprising the first pixel rib 312 and the second pixel rib 314), a width of a longitudinal cross section of the first pixel rib to a width of a longitudinal cross section of the second pixel rib ratio (A1/A2) can be designed to be larger than or equal to 1. When the electrowetting display device is operated (applied a voltage), the overflow problem of the conventional electrowetting display device due to the second liquid with more injection amount than the first liquid can be avoided. Also, a velocity of the first liquid attracting to the hydrophobic dielectric layer is improved. The response time, uniformity and reliability of an operational electrowetting display device can be improved.

While the embodiments have been described, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrowetting display device, comprising:
    a first substrate and a second substrate disposed opposite to each other;
    a first electrode layer disposed on the first substrate;
    a second electrode layer disposed on the second substrate;
    a hydrophobic dielectric layer disposed on the first electrode layer;
    a first pixel rib disposed on the first substrate;
    a second pixel rib disposed on the first pixel rib, wherein a contact angle of water with respect to the second pixel rib is larger than a contact angle of water with respect to the first pixel rib; and
    a first liquid and a second liquid disposed between the first substrate and the second substrate.

2. The electrowetting display device as claimed in claim 1, wherein the second liquid contacts the hydrophobic dielectric layer, and the first liquid is positioned on the second liquid.

3. The electrowetting display device as claimed in claim 1, wherein the first liquid is a polarized liquid and the second liquid is a weak polarized liquid, having a polarity which is weaker than that of the polarized liquid, or a non-polarized liquid.

4. The electrowetting display device as claimed in claim 1, wherein a total height of the first pixel rib and the second pixel rib is 3~50 μm.

5. The electrowetting display device as claimed in claim 1, wherein a chemical polarity of the second liquid is larger than or equal to 0, and smaller than or equal to 3.

6. The electrowetting display device as claimed in claim 1, wherein a shape of a longitudinal cross section of the first pixel rib is the same as that of the second pixel rib.

7. The electrowetting display device as claimed in claim 1, wherein a ratio of a width of a longitudinal cross section of the first pixel rib to a width of a longitudinal cross section of the second pixel rib is larger than or equal to 1.

8. The electrowetting display device as claimed in claim 7, wherein a height of the longitudinal cross section the first pixel rib is larger than or equal to 0.1 μm.

9. The electrowetting display device as claimed in claim 7, wherein the ratio of the width of a longitudinal cross section of the first pixel rib to the width of a longitudinal cross section of the second pixel rib is between 1:0.98 and 1:0.4.

10. The electrowetting display device as claimed in claim 7, wherein the contact angle of water with respect to the first pixel rib is between 20 and 70 degrees.

11. The electrowetting display device as claimed in claim 7, wherein the contact angle of water with respect to the second pixel rib is between 30 and 80 degrees.

12. The electrowetting display device as claimed in claim 1, wherein surface energies of the first pixel rib and the second pixel rib are larger than 36 mN/m.

13. The electrowetting display device as claimed in claim 1, wherein the contact angle of water with respect to the first pixel rib is between 20 and 60 degrees.

14. The electrowetting display device as claimed in claim 1, wherein the contact angle of water with respect to the second pixel rib is between 40 and 80 degrees.

15. The electrowetting display device as claimed in claim 1, wherein a normalized ratio of the contact angle of water with respect to the first pixel rib to the contact angle of water with respect to the second pixel rib is between 0.5:1 and 0.9:1.

16. The electrowetting display device as claimed in claim 1, wherein the first pixel rib and the second pixel rib comprise an ultra-violet light curing photoresist material or a thermal curing photoresist material, and the ultra-violet light curing photoresist material or the thermal curing photoresist material comprises polyethylene glycol-based materials, polyurethane-based materials, polyamide-based materials or poly(2-hydroxy ethyl methacrylate)-based materials.

17. The electrowetting display device as claimed in claim 1, wherein the first pixel rib and the second pixel rib respectively comprise an additive including an inorganic material or an organic material comprising a compound, which contains hydroxyl, aldehyde, carbonate, carboxylate, carboxylic, ether, carbonyl, oxyethylene group, hydroxyl group-containing acrylate, amid amine or oxime, a monomer or an oligomer.

18. The electrowetting display device as claimed in claim 17, wherein the organic material has a viscosity of less than 2000 cps/25° C.

19. The electrowetting display device as claimed in claim 1, wherein the second pixel rib contacts to the second electrode layer.

20. The electrowetting display device as claimed in claim 1, wherein the first pixel rib comprises a black matrix.

21. An electrowetting display device, comprising:
    a first substrate and a second substrate disposed opposite to each other;
    a first electrode layer disposed on the first substrate;
    a second electrode layer disposed on the second substrate;
    a hydrophobic dielectric layer disposed on the first electrode layer;
    a first pixel rib disposed on the first substrate;
    a second pixel rib disposed on the first pixel rib, wherein the first pixel rib and the second pixel rib comprise an ultra-violet light curing photoresist material or a thermal curing photoresist material, wherein the ultra-violet light curing photoresist material or the thermal curing photoresist material contains at least one hydrophilic material, and wherein a content of the at least one hydrophilic material of the first pixel rib is different from a content of the at least one hydrophilic material of the second pixel rib; and a first liquid and a second liquid disposed between the first substrate and the second substrate.

22. The electrowetting display device as claimed in claim 21, wherein the first liquid is a polarized liquid and the second liquid is a weak polarized liquid, having a polarity which is weaker than that of the polarized liquid, or a non-polarized liquid.

23. The electrowetting display device as claimed in claim 21, wherein a ratio of a width of a longitudinal cross section of the first pixel rib to a width of a longitudinal cross section of the second pixel rib is larger than or equal to 1.

24. The electrowetting display device as claimed in claim 23, wherein a height of the first pixel rib is larger than or equal to 0.1 μm.

25. The electrowetting display device as claimed in claim 23, wherein the ratio of a width of a longitudinal cross section of the first pixel rib to a width of a longitudinal cross section of the second pixel rib is between 1:0.98 and 1:0.4.

26. The electrowetting display device as claimed in claim 23, wherein a contact angle of water with respect to the first pixel rib is between 20 and 70 degrees, and a contact angle of water with respect to the second pixel rib is between 30 and 80 degrees.

27. The electrowetting display device as claimed in claim 21, wherein the at least one hydrophilic material comprises an inorganic material comprising a silicon-base substance, carbon nanotubes or titanium dioxide.

28. The electrowetting display device as claimed in claim 21, wherein the at least one hydrophilic material comprises an organic material comprising a compound, which contains hydroxyl, aldehyde, carbonate, carboxylate, carboxylic, ether, carbonyl, oxyethylene group, hydroxyl group-containing acrylate, amid amine or oxime, a monomer or an oligomer.

29. The electrowetting display device as claimed in claim 21, wherein surface energies of the first pixel rib and the second pixel rib are lager than 36 mN/m.

30. The electrowetting display device as claimed in claim 21, wherein a contact angle of water with respect to the first pixel rib is between 20 and 60 degrees, and a contact angle of water with respect to the second pixel rib is between 40 and 80 degrees.

31. An electrowetting display device, comprising:
a first substrate and a second substrate disposed opposite to each other;
a first electrode layer disposed on the first substrate;
a second electrode layer disposed on the second substrate;
a hydrophobic dielectric layer disposed on the first electrode layer;
a single pixel rib disposed on the first substrate, wherein the single pixel rib comprises a first hydrophilic region and a second hydrophilic region on the first hydrophilic region, and a contact angle of water with respect to the second hydrophilic region is larger than a contact angle of water with respect to the first hydrophilic region; and
a first liquid and a second liquid disposed between the first substrate and the second substrate.

32. The electrowetting display device as claimed in claim 31, wherein the first liquid is a polarized liquid and the second liquid is a weak polarized liquid, having a polarity which is weaker than that of the polarized liquid, or a non-polarized liquid.

33. The electrowetting display device as claimed in claim 31, wherein surface energies of the first hydrophilic region and the second hydrophilic region are larger than 36 mN/m.

34. The electrowetting display device as claimed in claim 31, wherein the contact angle of water with respect to the first hydrophilic region is between 20 and 60 degrees, and the contact angle of water with respect to the second hydrophilic region is between 40 and 80 degrees.

* * * * *